(12) United States Patent
Kittrell (10) Patent No.: US 8,904,657 B1
(45) Date of Patent: Dec. 9, 2014

(54) FLOOR PLAN PROJECTION APPARATUS (76) Inventor: Justin Kittrell, Lakeland, FL (US)

( * ) Notice: Subject to any disclaimer, the term of this patent is extended or adjusted under 35 U.S.C. 154(b) by 229 days.

(21) Appl. No.: 13/489,066

(22) Filed: Jun. 5, 2012

Related U.S. Application Data (60) Provisional application No. 61/494,647, filed on Jun. 8, 2011.

(51) Int. Cl.
G01C 15/02 (2006.01)
G01B 11/26 (2006.01)

(52) U.S. Cl.
USPC .................. 33/286; 33/1 G; 33/263; 33/299

(58) Field of Classification Search
USPC ................... 33/286, 1 G, 1 CC, 263, 299
See application file for complete search history.

(56) References Cited

U.S. PATENT DOCUMENTS

| 2,495,975 | A | * | 1/1950 | Norval | 33/1 G |
| 3,171,204 | A | * | 3/1965 | Balducci | 33/1 G |
| 6,122,865 | A | * | 9/2000 | Branc et al. | 52/36.1 |
| 6,609,307 | B1 | * | 8/2003 | Haynes et al. | 33/286 |
| 6,725,551 | B1 | * | 4/2004 | Sutton | 33/286 |
| 7,174,647 | B2 | * | 2/2007 | Krantz et al. | 33/286 |
| 7,866,052 | B2 | * | 1/2011 | Schulze | 33/1 G |
| 8,087,176 | B1 | * | 1/2012 | Hayes et al. | 33/280 |
| 8,087,179 | B1 | * | 1/2012 | Gomez | 33/563 |
| 2001/0029675 | A1 | * | 10/2001 | Webb | 33/286 |
| 2003/0000094 | A1 | * | 1/2003 | Tamamura | 33/286 |
| 2013/0074350 | A1 | * | 3/2013 | Le Mer et al. | 33/228 |
| 2013/0326892 | A1 | * | 12/2013 | Schorr | 33/228 |

* cited by examiner

Primary Examiner — Christopher Fulton
(74) Attorney, Agent, or Firm — Maxey Law Offices, PLLC; Stephen Lewellyn (57) ABSTRACT

The present invention relates generally to a floor plan projection apparatus, using a scanning laser projector, to project a floor plan on a floor surface to indicate where to position furnishings such as tables, chairs, decorations, lighting fixtures, and displays on the floor. The use of the floor plan projection apparatus eliminates the need to physically measure and layout the floor surface according to the desired floor plan which is typically a very labor-intensive and time-consuming task, requiring a large staff of workers. The present invention increases the efficiency in setting up for events, decreases the time to setup, and decreases the number of labor staff required for setting up the event.

8 Claims, 14 Drawing Sheets

FIG. 2

3 PIECE MECHANISM

FLOOR PLAN PROJECTION APPARATUS

CROSS-REFERENCE TO RELATED APPLICATIONS

This application is a non-provisional of U.S. patent application Ser. No. 61/494,647, filed on Jun. 8, 2011, the entirety of which is incorporated herein by reference.

FIELD OF THE INVENTION

The present invention relates generally to arranging furnishings in convention centers, banquet halls and the like according to a desired floor plan, and more particularly, relating to a floor plan projection apparatus for assisting in the placement of furnishings according to a desired floor plan.

BACKGROUND OF THE INVENTION

Setting up an event in facilities such as banquet halls or convention centers requires detailed planning of the location and positioning of various desired furnishings such as, for example, tables, chairs, decorations, lighting fixtures, and displays, etc. Conventionally, a floor plan is created for a particular event and includes the dimensions and placement of each furnishing for the event. Using the floor plan, event staff physically measures out and marks the floor plan on the floor surface for the placement and positioning of each furnishing. Depending on the number of furnishings and the floor area, this process is typically very labor-intensive, time-consuming, and requires a large staff of workers, resulting in increased setup costs and event setup time.

Convention centers and banquet halls generate income based on the number of events that can be hosted in a given time period. It is desirable, therefore, to use such facilities as efficiently as possible to increase the number of events that may be hosted in a given time period and, thus, to increase revenue generated by the facility. One measure of efficiency is the time required to setup for each event. Increasing the number of labor staff during setup decreases the setup time but also increases labor costs. Therefore, there is a need to increase the efficiency in the setup of events by decreasing the setup time and by decreasing the labor staff for setting up the event.

SUMMARY OF THE INVENTION

Embodiments of the present invention address this need by providing a floor plan projection apparatus for projecting a desired floor plan on to a floor surface. The projected floor plan includes an indication of each particular furnishing, its location, and its position on the floor. Accordingly, the need to physically measure and layout a floor surface according to a desired floor plan for each furnishing is eliminated. In embodiments, the floor plan projection apparatus uses a scanning laser projector to project a floor plan on the floor surface.

There has thus been outlined, rather broadly, the more important features of the invention in order that the detailed description thereof that follows may be better understood and in order that the present contribution to the art may be better appreciated.

Numerous objects, features, and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages, and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and, together with the description, serve to explain the principles of the invention, in which.

DETAILED DESCRIPTION OF THE INVENTION

As a preliminary matter, it should be noted that in this document (including the claims) directional terms, such as "above", "below", "upper", and "lower", etc., are used for convenience in referring to the accompanying drawings. Additionally, it is to be understood that the various embodiments of the present invention described herein may be utilized in various orientations, such as inclined, inverted, horizontal, and vertical, etc., without departing from the principles of the present invention.

In FIGS. 1-6, there is representatively illustrated, an apparatus 10 for projecting a floor plan onto a floor surface such as, for example, a floor surface of a banquet hall as a guide in the placement of furnishings according to the floor plan for a particular event.

Apparatus 10 includes a casing or housing 12 which houses and protects various electrical components of the apparatus that will be described in more detail below. Extending from the bottom of the housing 12 is a projector 14 that may include a transparent dome-shaped covering 16. Projector 14 may be of any conventional projectors capable of projecting an image onto a surface such as, for example, a scanning laser projector. Covering 16 permits the projector 14 to project an image about a 360-degree rotation about a vertical axis of the apparatus 10 while protecting the projector from damage. Projector 14, as conventional projectors, may include various controls to permit adjustment of the focus of the projected image on a projection surface.

Apparatus 10 further includes a mount 18 permitting the attachment of the housing 12 to a ceiling surface above a floor onto which a floor plan is to be projected by projector 14. Mount 18 includes a ball and socket joint 20 having a socket housing 22 and a ball 24 captively disposed for rotation within the socket housing. Ball 24 can be secured from rotation within socket housing 22 by lock screw 34 threaded through socket housing 22 for abutment with the ball 24. The ball 24 of mount 18 is detachably connected to housing 12 by cooperative connectors 26 and 28. Connector 26 is conjoined with ball 24 by a shaft 30. Connector 28 is integral with, or fixedly fastened to, housing 12. Connectors 26 and 28 may include a spring biased latch or catch 29 that is releasable by operation of button 32. The socket housing 22 of mount 18 is detachably connected to a ceiling surface by a second pair of cooperative connectors 26' and 28'. Connector 26' is not shown in FIGS. 1-6, however it is understood connector 26' is similar to connector 26.

Apparatus 10 further includes a pair of handles 36 and 38 extending from opposite sides of the housing 12. Handles 36 and 38 provide a user grasp during transportation, mounting, and adjusting of the apparatus 10.

Figure 1:
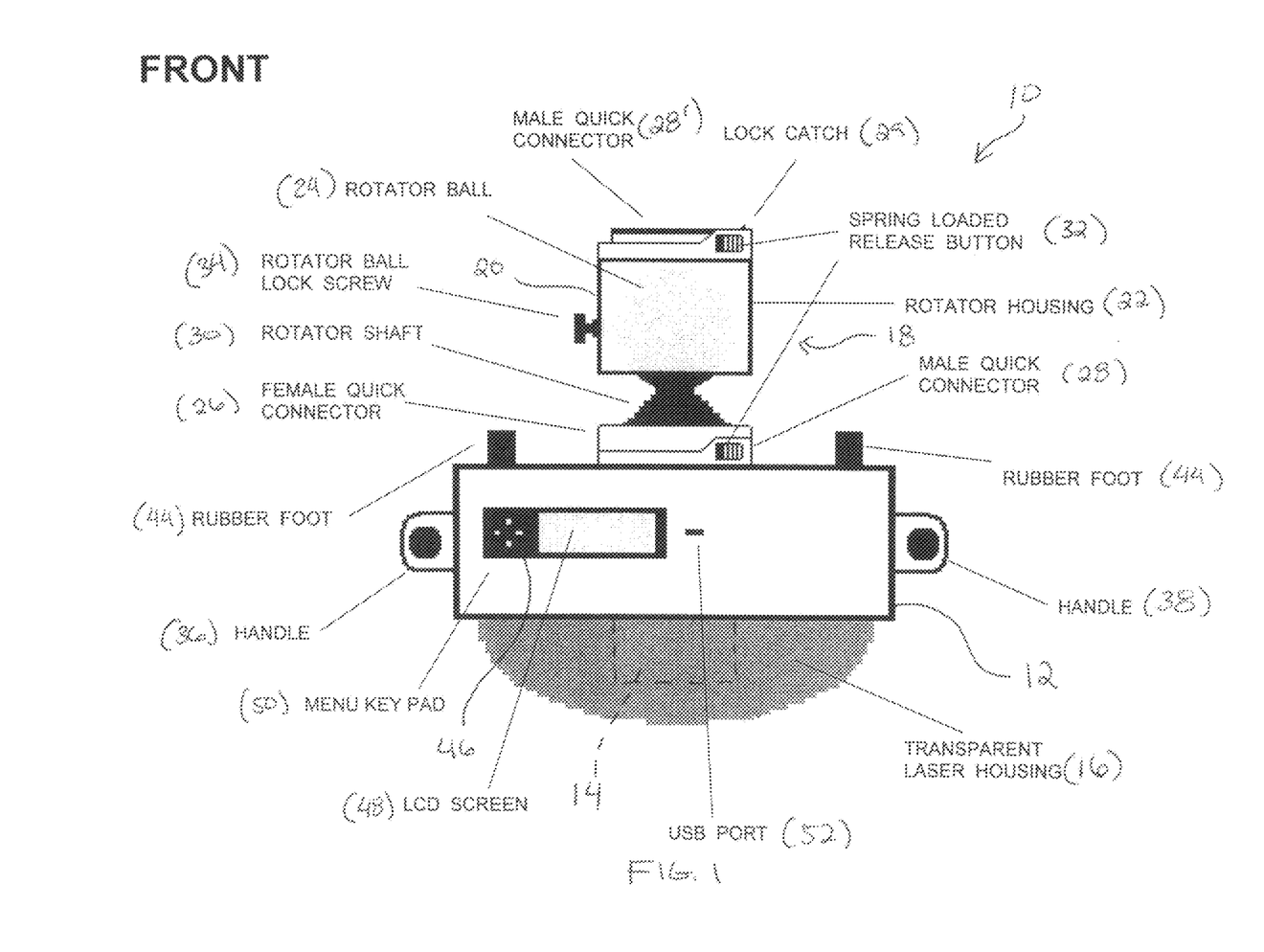
FIG. 1 is a diagrammatic front elevation view of a floor plan projection apparatus constructed in accordance with the principles of the present invention.

FIG. 1 is a diagrammatic front view of the apparatus 10, wherein it can further be seen the apparatus 10 includes a display panel 46 on the front of the housing 12. Display panel 46 may include an LCD screen 48 and a user input or control pad 50. A USB or similar interface port 52 is also shown and may be provided to permit the connection of the apparatus 10 to an external memory source or computer.

Figure 2:
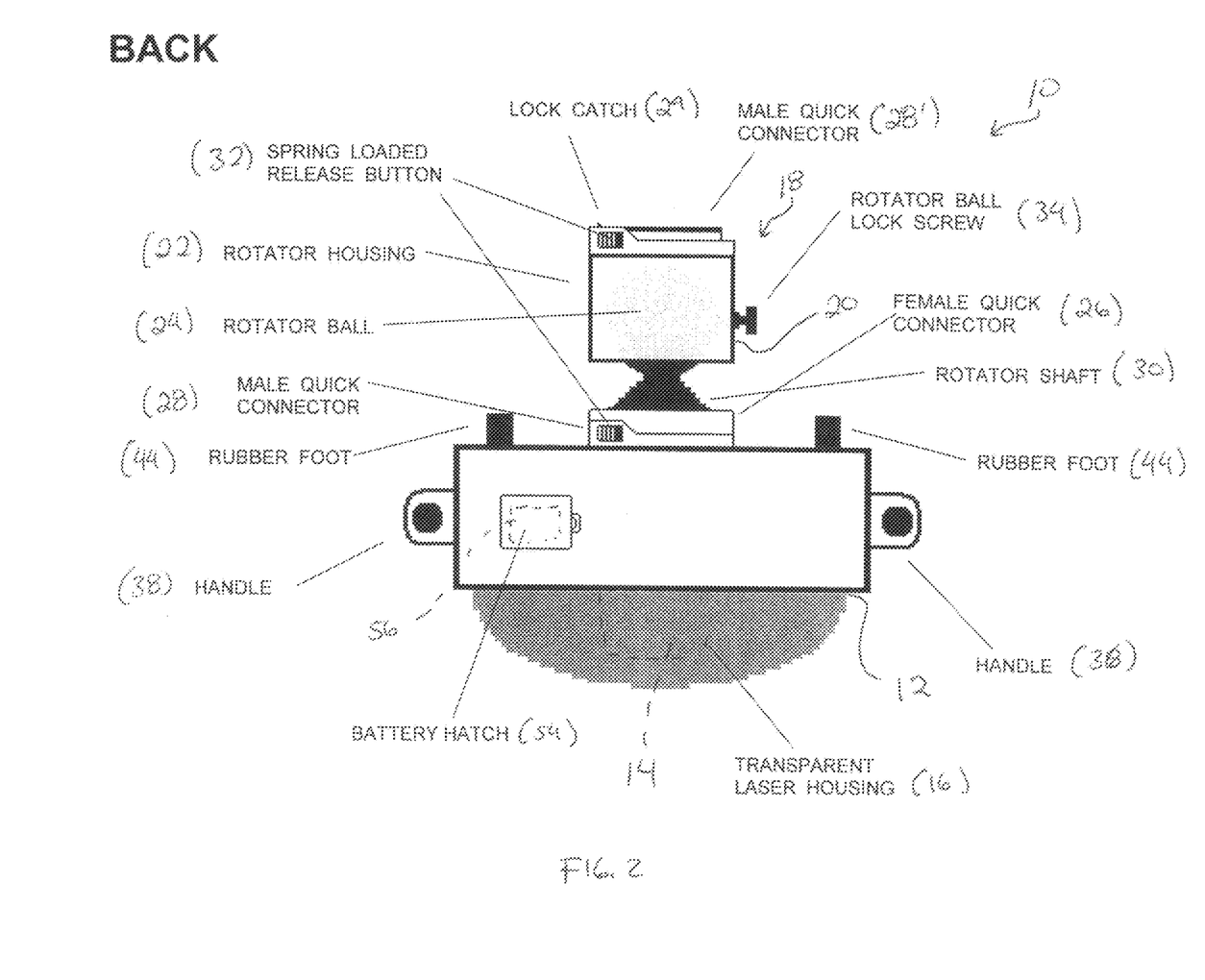
FIG. 2 is a diagrammatic rear elevation view of the floor plan projection apparatus of FIG. 1.

FIG. 2 is a diagrammatic rear view of the apparatus 10, wherein it can further be seen the apparatus 10 may include a battery cover 54 on housing 12 to permit access to an internal battery 56. Battery 56 can be charged through port 52.

Figure 3:
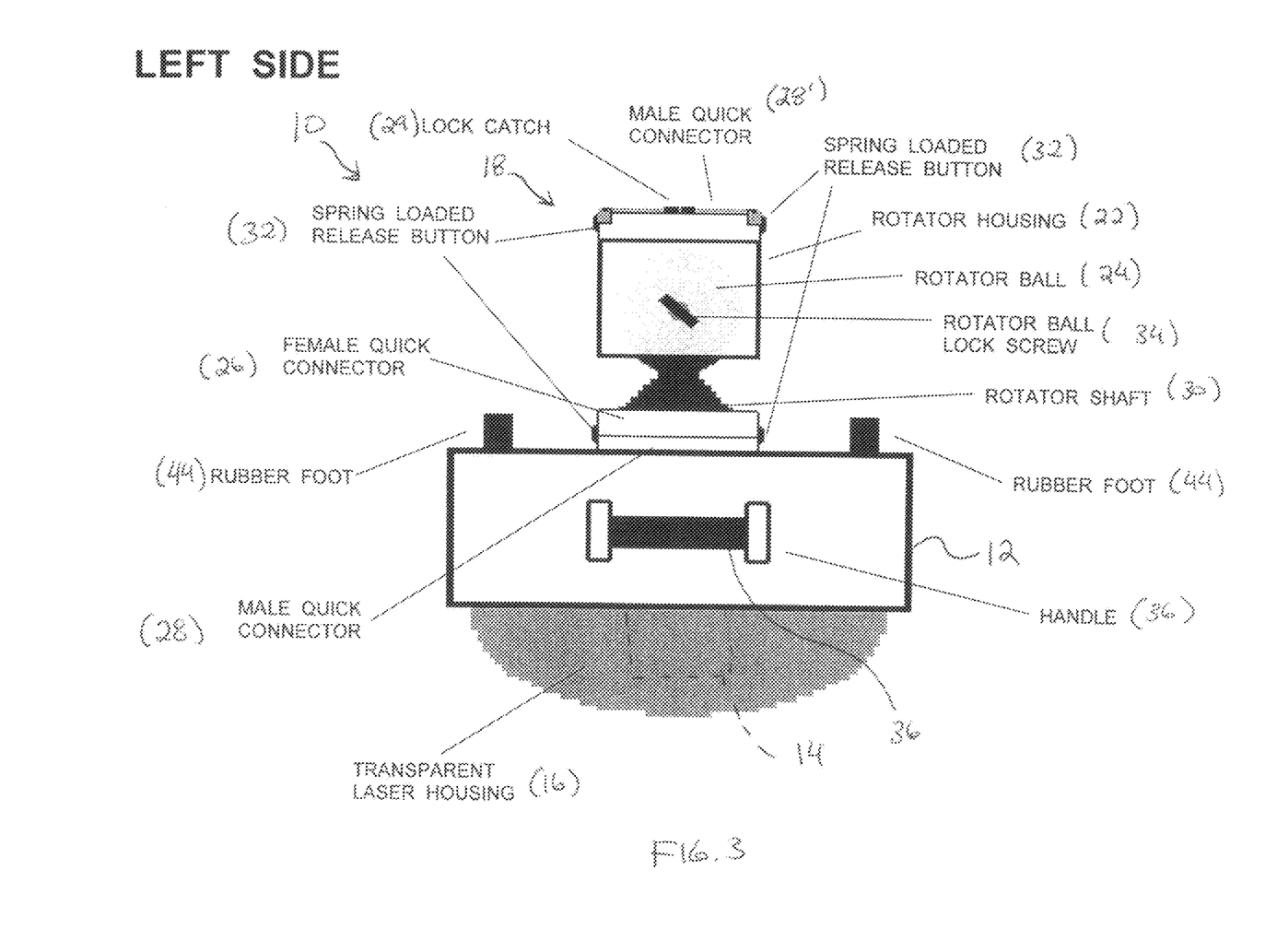
FIG. 3 is a diagrammatic left side elevation view of the floor plan projection apparatus of FIG. 1.
Figure 4:
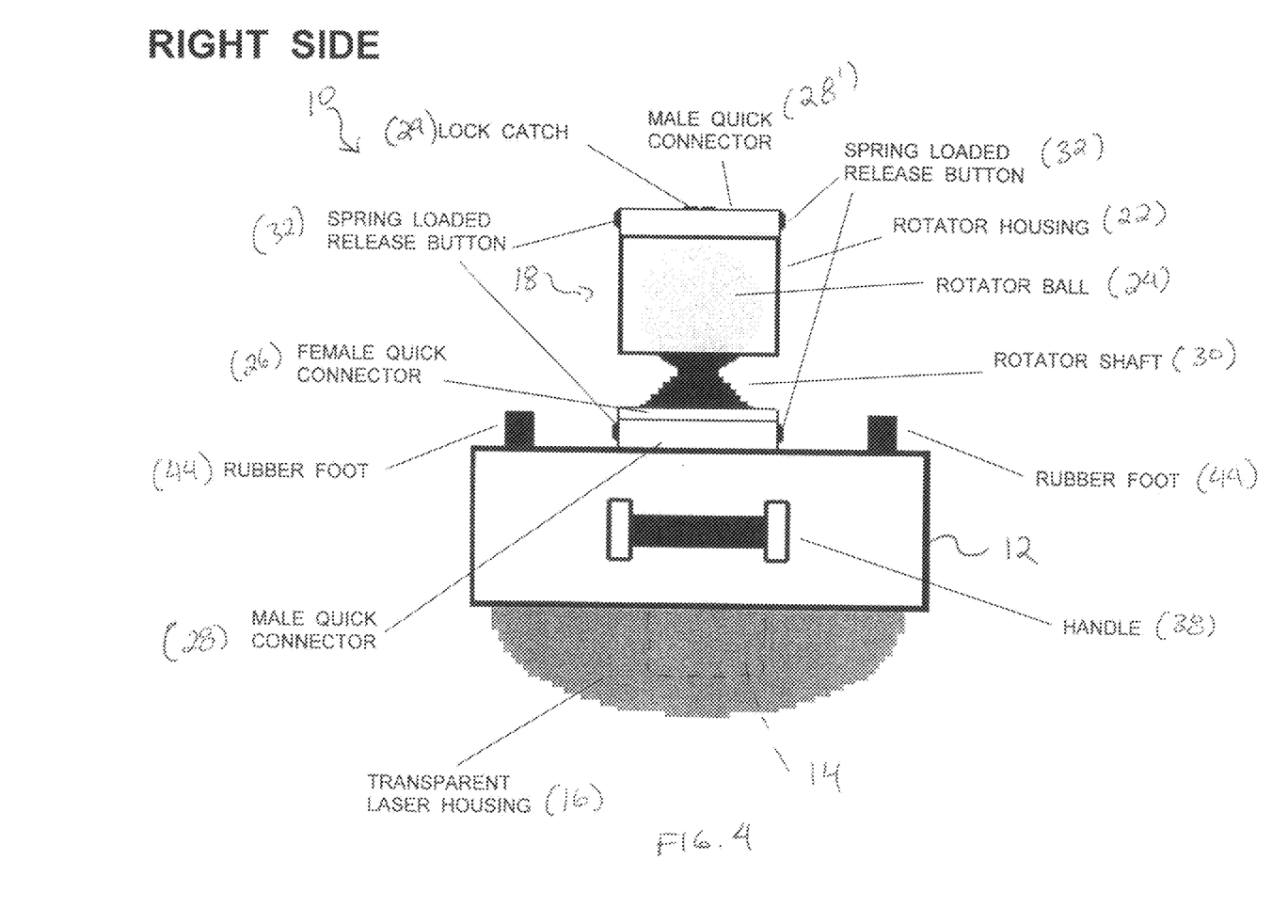
FIG. 4 is a diagrammatic right side elevation view of the floor plan projection apparatus of FIG. 1.

FIGS. 3 and 4 are diagrammatic left and right side views, respectively, of apparatus 10, further illustrating the various components of the apparatus 10.

Figure 5:
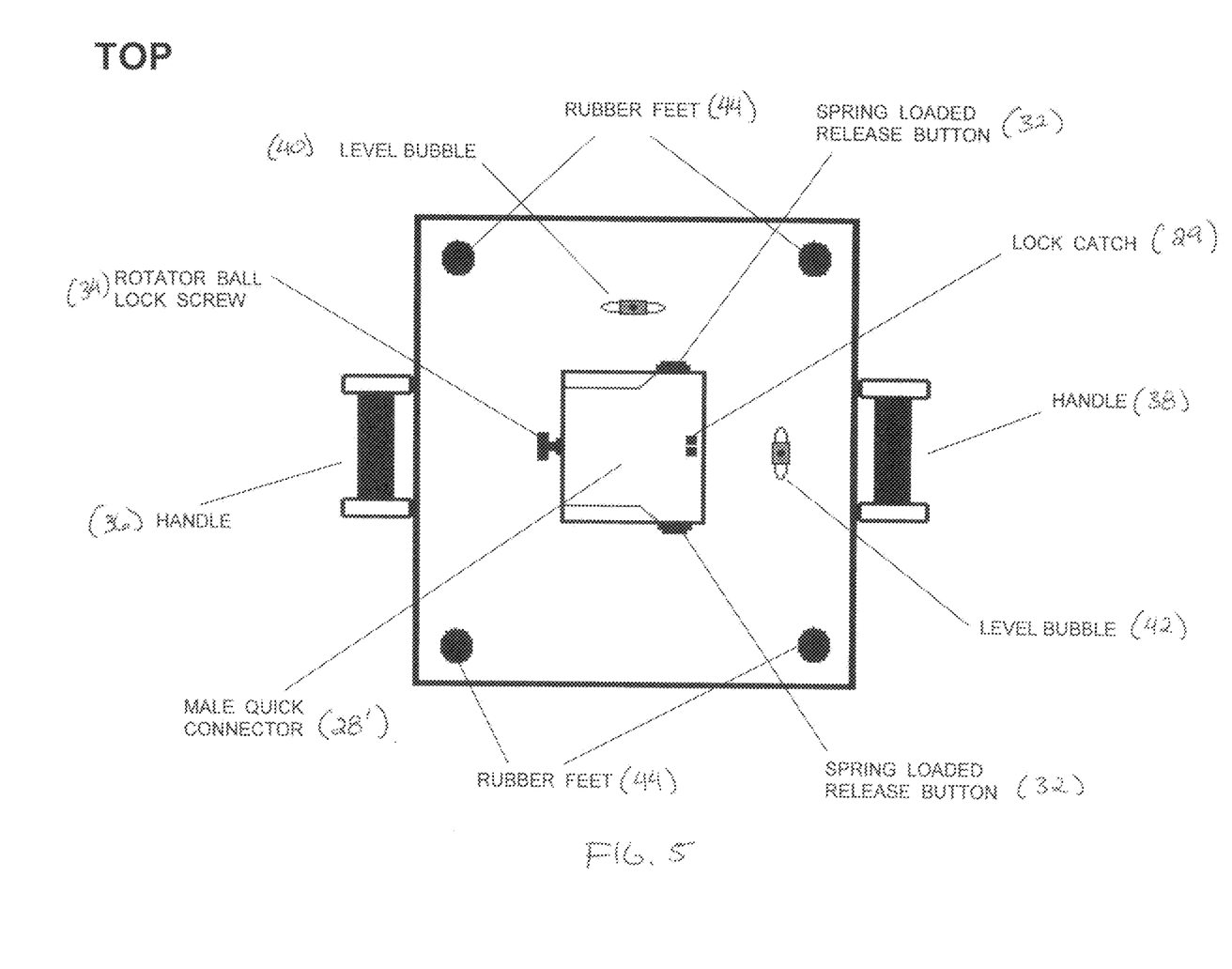
FIG. 5 is a diagrammatic top plan view of the floor plan projection apparatus of FIG. 1.

FIG. 5 is a top diagrammatic view of the apparatus 10, wherein it can be further seen the apparatus 10 includes a pair of bubble levels 40 and 42 on housing 12. Bubble levels 40 and 42 are arranged orthogonally to each other to permit leveling of the apparatus 10 along both the transverse and longitudinal directions. FIG. 5 further illustrates all four feet 44, one each positioned at a corner of the housing 12.

Figure 6:
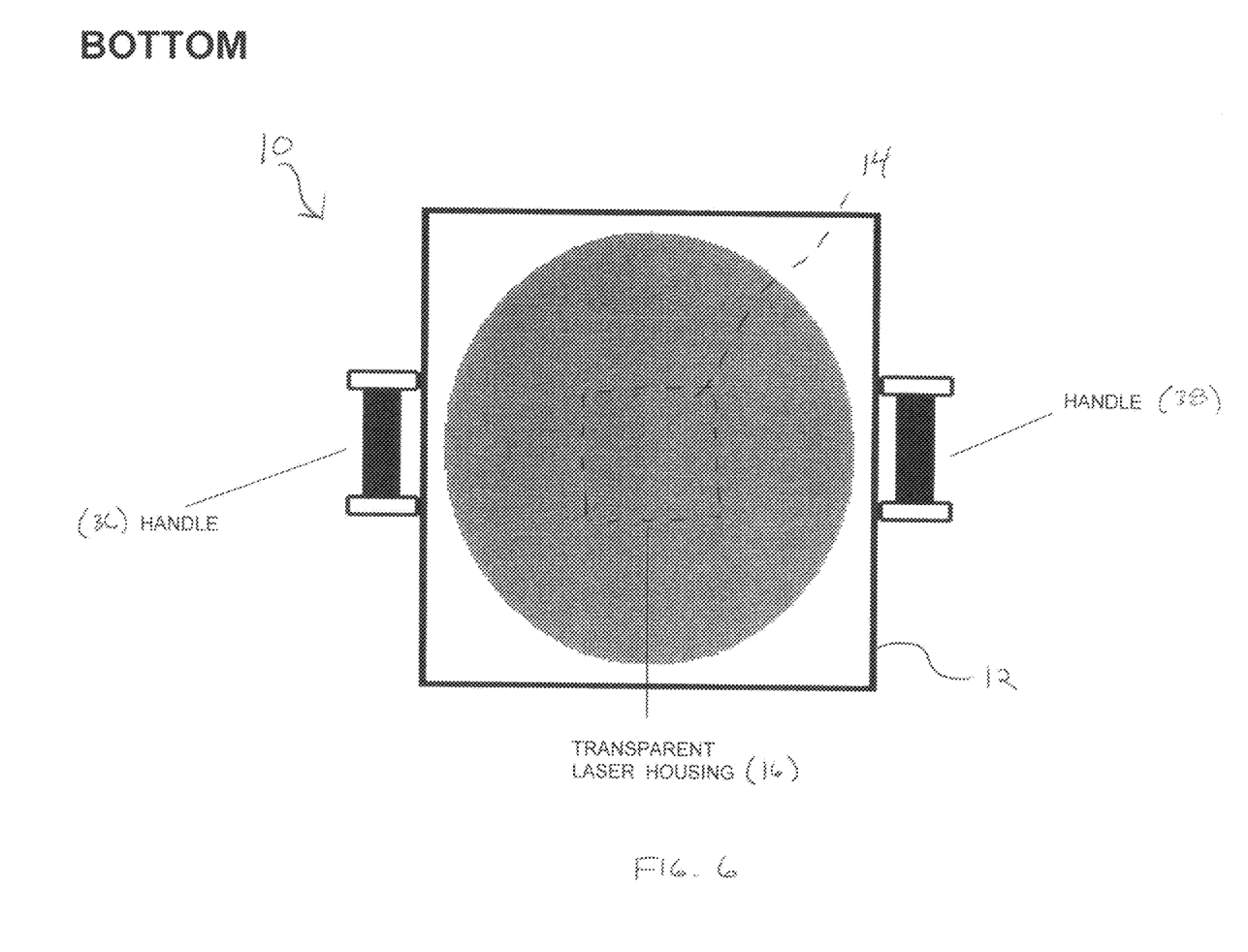
FIG. 6 is a diagrammatic bottom plan view of the floor plan projection apparatus of FIG. 1.

FIG. 6 is a bottom diagrammatic view of the apparatus 10. Here the full hemisphere of the dome cover 16 can be seen covering the projector 14. Further illustrated are the handles 36 and 38.

Figure 7:
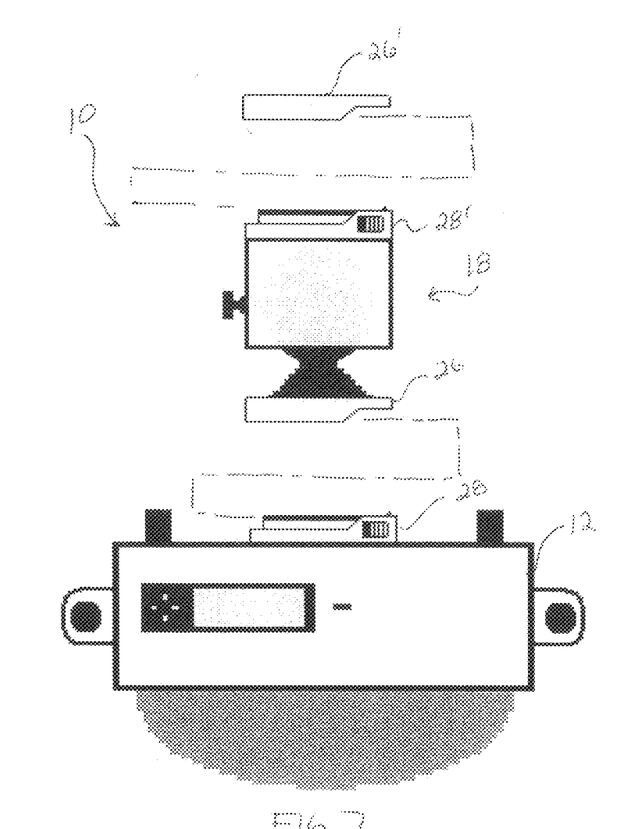
FIG. 7 is a diagrammatic front elevation view of the floor plan projection apparatus of FIG. 1, illustrating a mount in an exploded assembly view.

FIG. 7 is a diagrammatic view of the apparatus 10 with mount 18 exploded. Here it can be seen coupling 26' is received by coupling 28' for connection therewith, and coupling 26 is received by coupling 28 for connection therewith.

Figure 8:
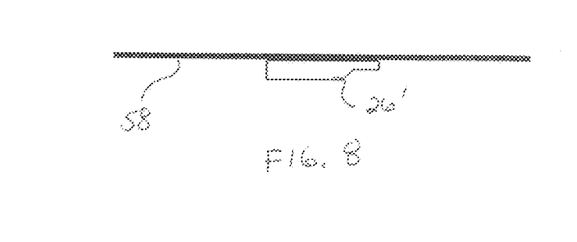
FIG. 8 is a diagrammatic elevation view of a coupling portion of the mount attached to a ceiling surface.

FIG. 8 is a diagrammatic view of coupling 26' secured to a ceiling surface 58 for connection with coupling 28' or coupling 28 to mount the apparatus 10 to the ceiling surface and to depend therefrom. It should be noted, multiple couplings 26' could be installed on a ceiling surface to have multiple permanent hanging points on a ceiling surface throughout a facility so as not to require the purchase of more projection apparatuses than needed.

Figure 9:
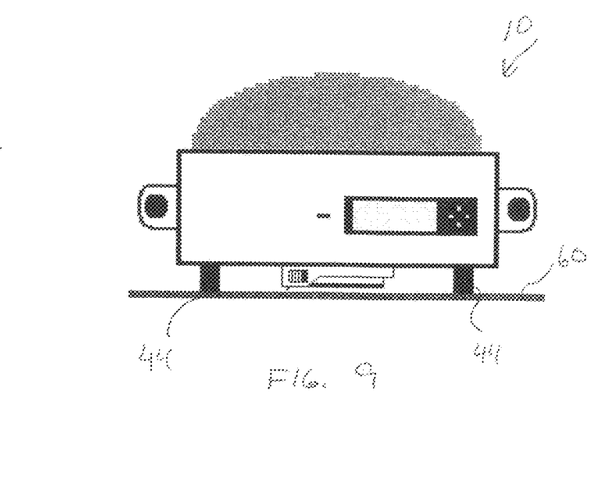
FIG. 9 is a diagrammatic elevation view of the floor plan projection apparatus of FIG. 1.
Figure 10A:
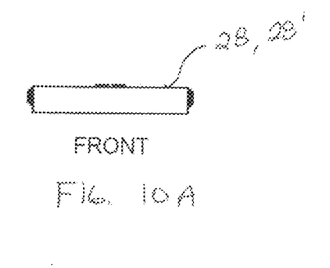
FIGS. 10A-10D are various views of a first coupling of the mount.
Figure 10B:
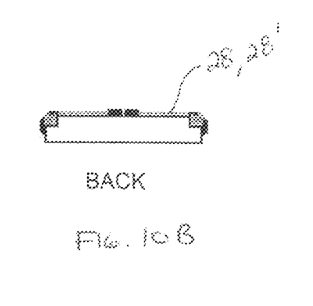
Figure 10C:
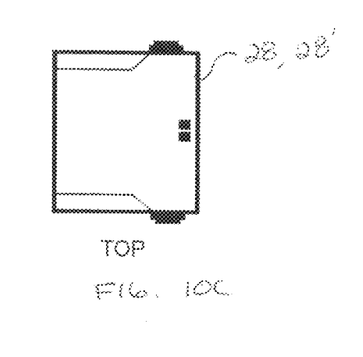
Figure 10D:
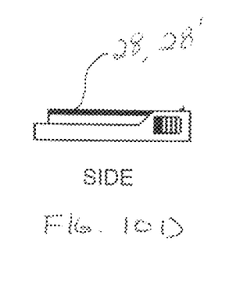
Figure 11A:
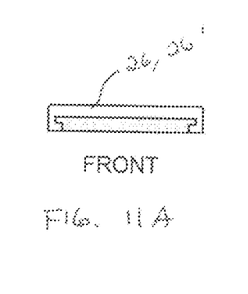
FIGS. 11A-11D are various views of a second coupling of the mount.
Figure 11B:
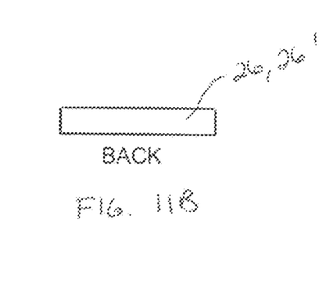
Figure 11C:
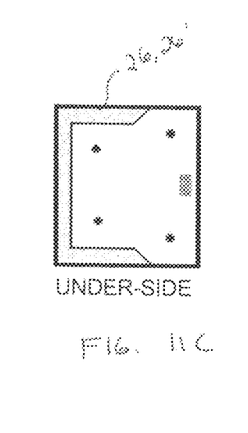
Figure 11D:
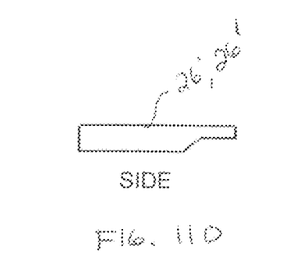

FIG. 9 is a diagrammatic view of apparatus 10 resting on a support surface 60 and supported by feet 44 such as, for example, when the apparatus is not in use.

FIGS. 10A-10D are front, back, top, and side views, respectively, of coupling 28, 28' and further illustrate the structure of the coupling.

FIGS. 11A-11D are front, back, bottom, and side views, respectively, of coupling 26, 26' and further illustrate the structure of the coupling.

Figure 12:
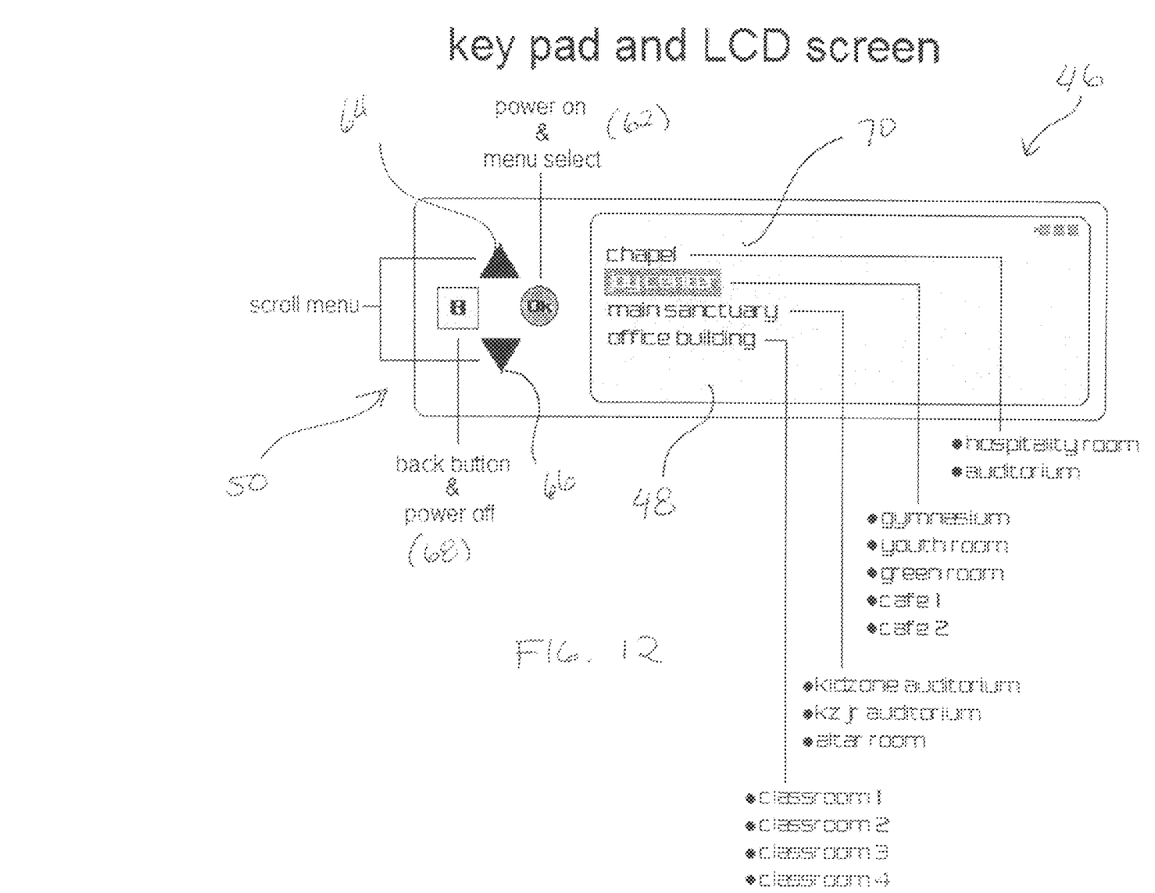
FIG. 12 is an exemplary diagrammatic view of a display of the floor plan projection apparatus.

FIG. 12 is a diagrammatic enlarged view of display panel 46 illustrating a possible user input 50 and display 48. The user input 50 may include a "power on" and "menu select" button 62, forward and backward scroll buttons 64 and 66, and a "back" and "power off" button 68. Display 48, in one menu screen, may display site locations 70 for selection and then, based upon the user selection, display specific rooms at the selected site location.

Figure 13:
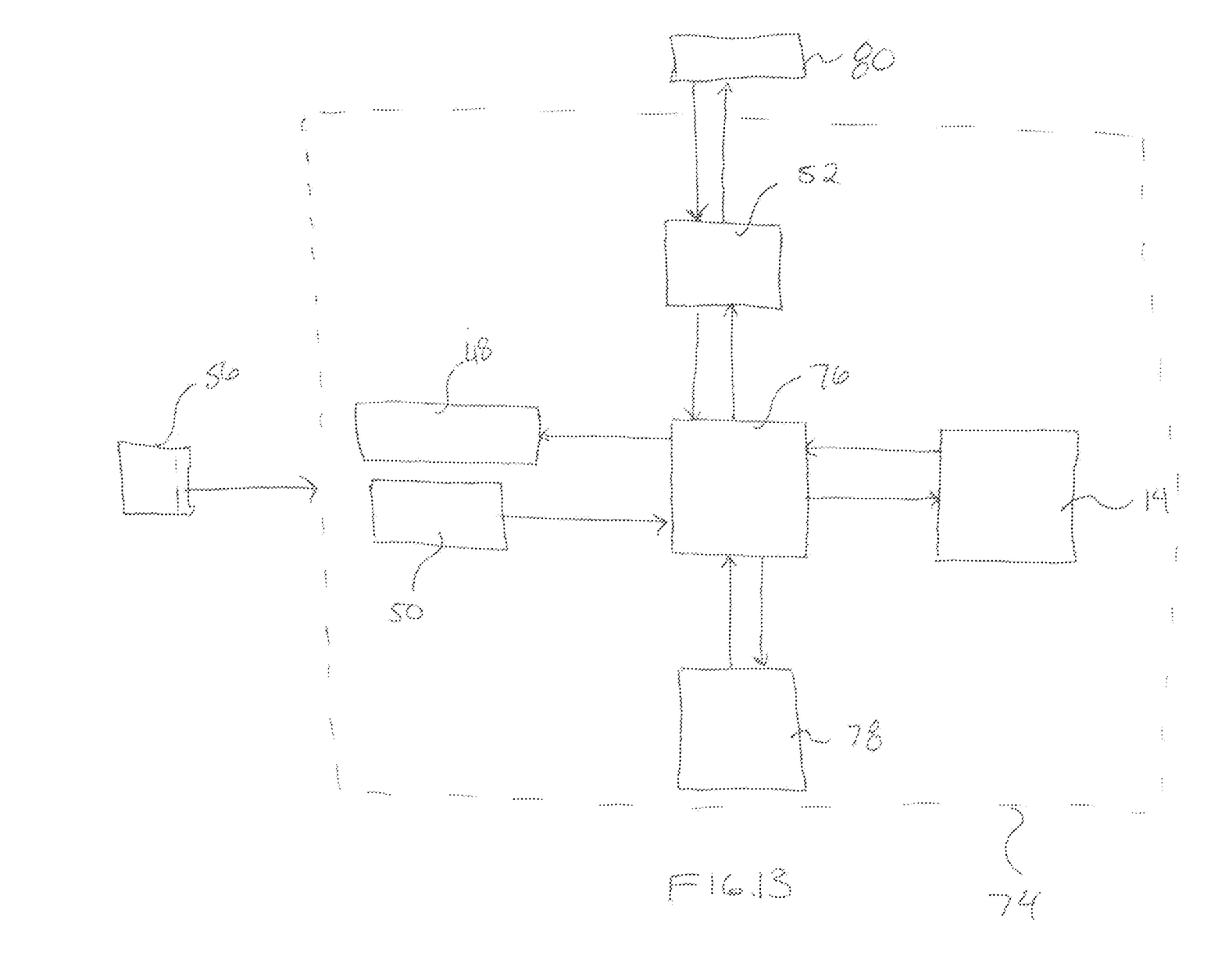
FIG. 13 is block diagram of a control system of the floor plan projection apparatus.

FIG. 13 is a block diagram of a control system 74 for operating the apparatus 10 and projector 14. Control system 74 includes a programmable logic controller (PLC) 76, or the like, operatively connected to the projector 14, the display 48, the user input 50, interface port 52, and a memory device 78. Control system 74 and the various components thereof receive electrical power from power source 56, which may be a battery or source of external power connected to the apparatus by an electrical power cord. An external computer or memory device 80 may be operatively connected to the PLC 76 by connection with interface port 52.

Figure 14:
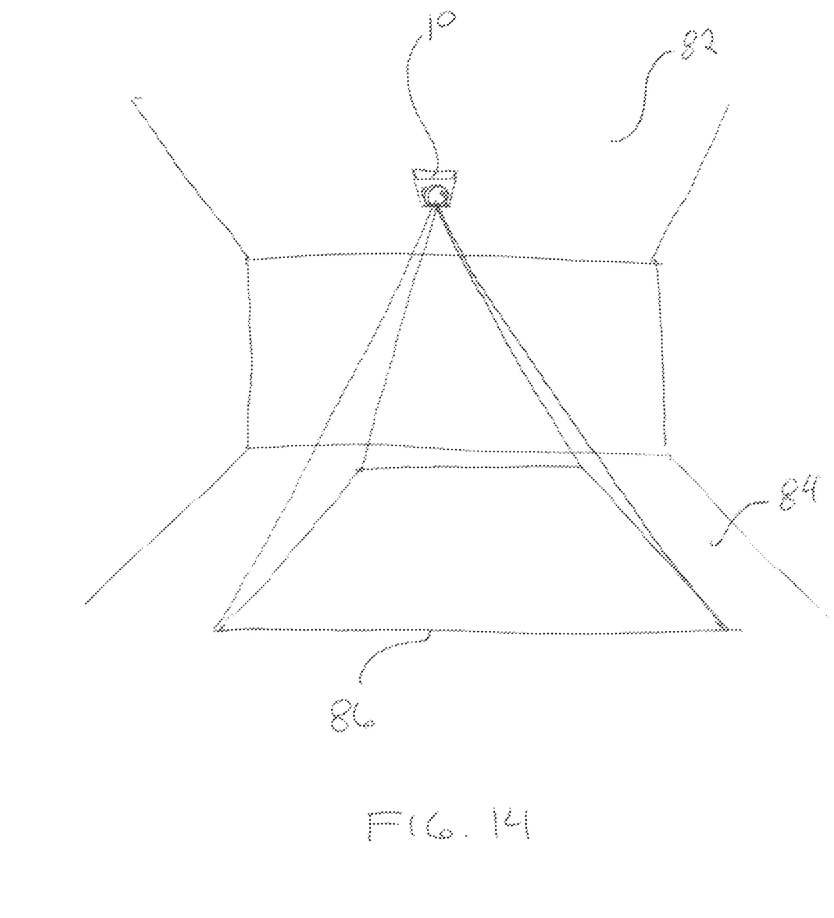
FIG. 14 is a diagrammatic in-use view of the floor plan projection apparatus mounted to a ceiling surface and projecting a floor plan on a floor surface.
Figure 15:
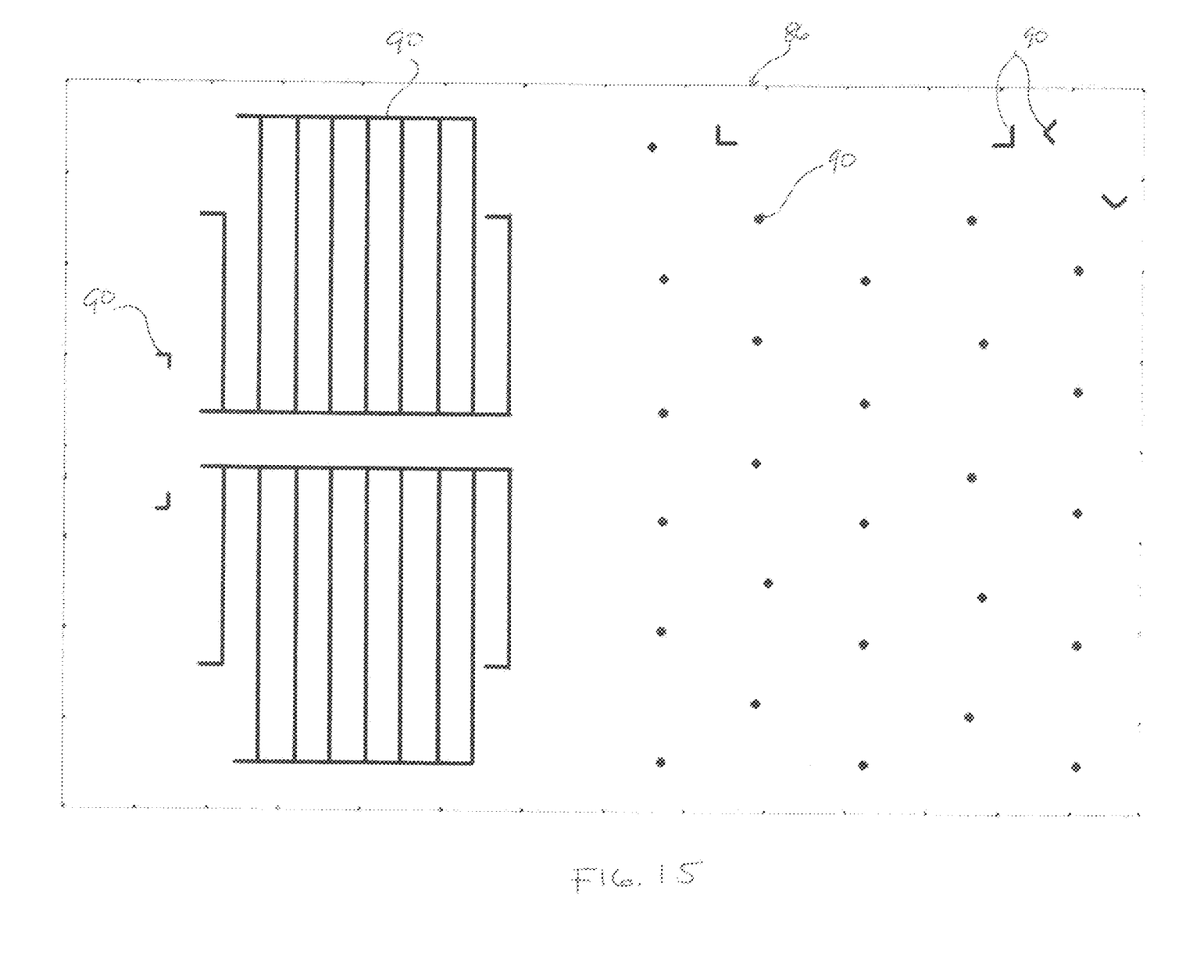
FIG. 15 is a diagrammatic view of a projected floor plan.
Figure 16:
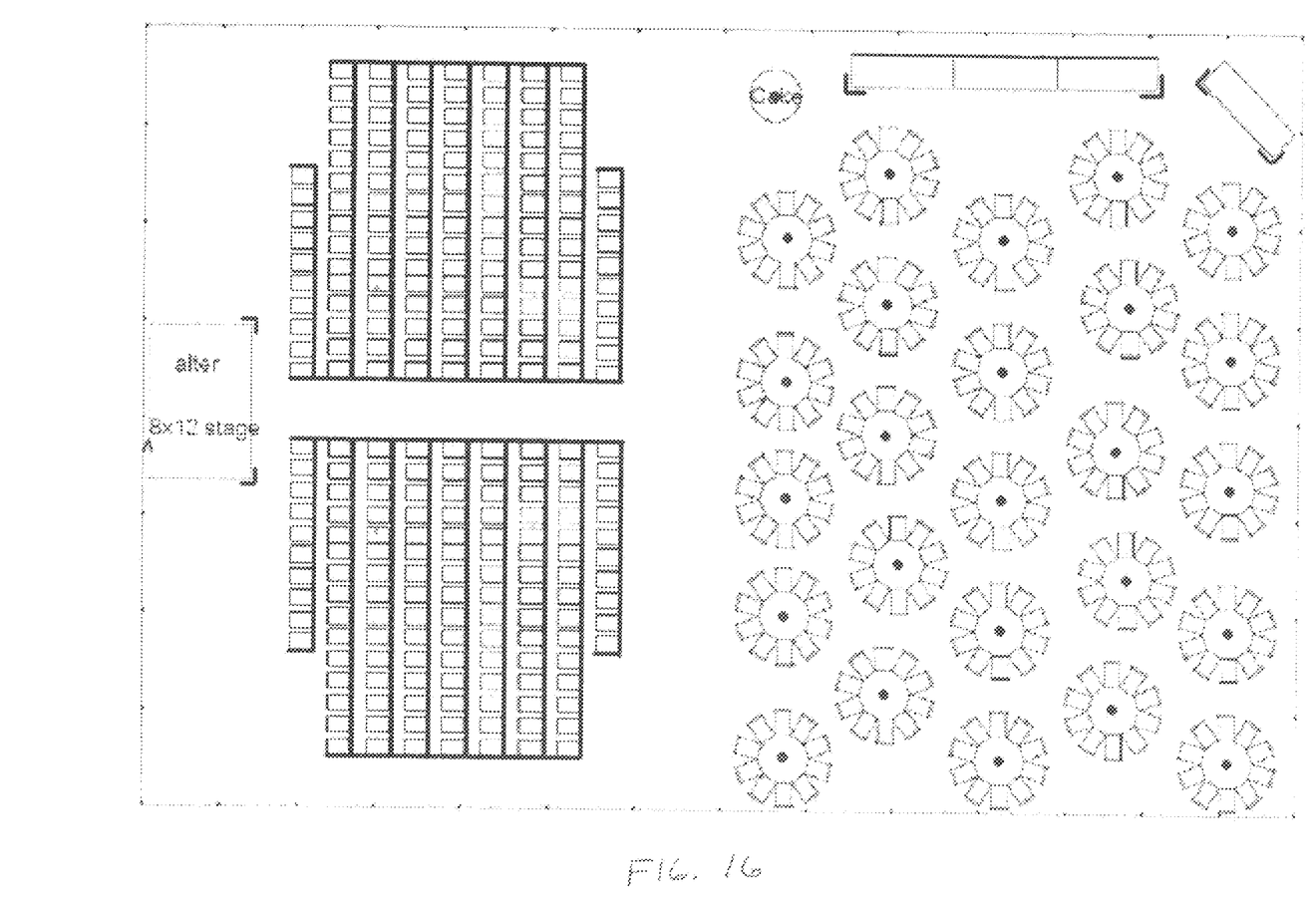
FIG. 16 is a composite diagrammatic view of the projected floor plan of FIG. 15 and a floor plan comprising a desired room set up.

With reference to FIG. 14, in operation, it can now be understood, the PLC 76 of the apparatus 10 is preprogrammed or loaded through interface 52 with a desired floor plan that is previously constructed using a computer aided drafting program. Apparatus 10 is mounted to a ceiling surface 82 above a floor surface 84 upon which furnishings are to be placed, according to the desired floor plan. Apparatus 10 is operated through user interface 50, or an external computer connected to interface 52, to select the desired floor plan to be projected. Once selected, the apparatus 10 operates projector 14 to project a floor plan image 86, comprising indicators such as dots, lines, grid-like patterns, or other geometric shapes on the floor surface 84. An exemplary floor plan image 86 is shown in FIG. 15, where the various projected indicators 90 provide the location of furnishings according to a desired room set up. The floor plan image 86 of FIG. 15 could be a composite of several projected floor plan images. FIG. 16 is a composite image of the floor plan image 86 of FIG. 15 and a floor plan comprising the desired room set up.

Depending on the size of the floor plan, apparatus 10 may have to be removed and remounted to the ceiling surface 82 according the floor plan to complete the placement of furnishings. Alternatively, two or more apparatus 10 may be interconnected through interface port 52, or through a wireless connection, to cooperatively project several separate floor plan images on the floor surface, each forming a portion of the total floor plan. Workers can then place furnishings according to the projected floor plan quickly and easily without first physically measuring out and marking the floor for each furnishing.

Apparatus 10 may further be programmed with instructions for setting up the apparatus according to a particular floor plan. The instructions are provided according to the specific room dimensions, and the desired floor plan. The instructions provide the ability for users to easily install and use the apparatus according to each floor plan.

A number of embodiments of the present invention have been described. Nevertheless, it will be understood that various modifications may be made without departing from the spirit and scope of the invention.

What is claimed is:

1. An apparatus for projecting a floor plan onto a floor surface, comprising:
    a projector configured to project an image therefrom onto a projection surface;
    a control system operatively connected to said projector and operating to cause said projector to project a floor plan image onto the projection surface;
    a housing, said projector extending from a bottom of said housing;
    a mount on said housing opposite of said projector, said mount configured to removably attach said housing to a ceiling surface above a floor surface upon which said floor plan image is to be projected by said projector;
    a socket housing detachably connectable to the ceiling surface; and
    a ball captively disposed for rotation within said socket housing, said ball being secured from rotation within said socket housing by a lock screw threaded through said socket housing for abutment with said ball, said ball having a ball shaft extending therefrom and wherein said ball is detachably connectable to said housing by said ball shaft.

2. The apparatus of claim 1, wherein said floor plan image includes indictors providing locations of furnishing placement according to a desired floor plan.

3. The apparatus of claim 1, wherein said control system includes a programmable logic controller operatively connected to said projector, operatively connected to a display, operatively connected to a user input, operatively connected to an interface port, and operatively connected to a memory device.

4. The apparatus of claim 1, further comprising:
    a pair of bubble levels on said housing and arranged orthogonally to one another.

5. The apparatus of claim 1, further comprising:
    one or more handles on said housing for grasping by a user in positioning and carrying said housing.

6. The apparatus of claim 1, further comprising a plurality of support legs extending from said top of said housing, and arranged so as to support said housing on a surface with said projector extending upwardly from said housing.

7. An apparatus for projecting a floor plan onto a floor surface, comprising:
    a housing configured to contain and protect electrical components of the apparatus;
    a projector configured to project an image therefrom onto a floor surface, said projector extending from a bottom of said housing;
    a control system including a programmable logic controller, a display, a user input, an interface port, and a memory device, said programmable logic controller operatively connected to said projector, said display, said user input, said interface port, and said a memory device, said control system operative to cause said projector to project a floor plan image onto the floor surface;
    a mount on said housing opposite of said projector, said mount configured to removably attach said housing to a ceiling surface above the floor surface upon which said floor plan image is to be projected by said projector;
    a pair of bubble levels on a top of said housing and arranged orthogonally to one another so as to permit leveling of the apparatus along both transverse and longitudinal directions;
    a first pair of cooperative connectors;
    a socket housing connected to one connector of said first pair of cooperative connectors, the second connector of said first pair of cooperative connectors configured for attachment with the ceiling surface;
    a second pair of cooperative connectors; and
    a ball having a ball shaft, said ball being captively disposed for rotation within said socket housing with said ball shaft extending from said socket housing, said ball shaft connected to one connector of said second pair of connectors, the second connector of said second pair of connectors connected to said top of said housing.

8. The apparatus of claim 7, wherein said floor plan image includes indictors providing locations of furnishing placement according to a desired floor plan.

* * * * *